Dec. 9, 1969    B. R. ANKERSEN    3,482,826
ROTARY HEARTH METAL MELTING FURNACES
Filed Aug. 21, 1967    2 Sheets-Sheet 1

INVENTOR
Borge Richard Ankersen

Dec. 9, 1969  B. R. ANKERSEN  3,482,826
ROTARY HEARTH METAL MELTING FURNACES
Filed Aug. 21, 1967  2 Sheets-Sheet 2

INVENTOR
Borge Richard Ankersen 3,482,826
ROTARY HEARTH METAL MELTING FURNACES
Borge Richard Ankersen, 2420 Private Drive,
Lake Angelus, Pontiac, Mich. 48055
Filed Aug. 21, 1967, Ser. No. 661,931
Int. Cl. F27b 3/06, 3/16, 11/02
U.S. Cl. 266—33          5 Claims

ABSTRACT OF THE DISCLOSURE

A rotary hearth metal melting furnace having an inverted conical hearth rotatable about a vertical axis, a roof above the hearth, a burner means in the roof and a gate in the roof acting in one position to close the roof and in the other as a radial blade extending into the bath in the hearth to cause molten metal to flow over a portion of the gate.

---

Figure 1:
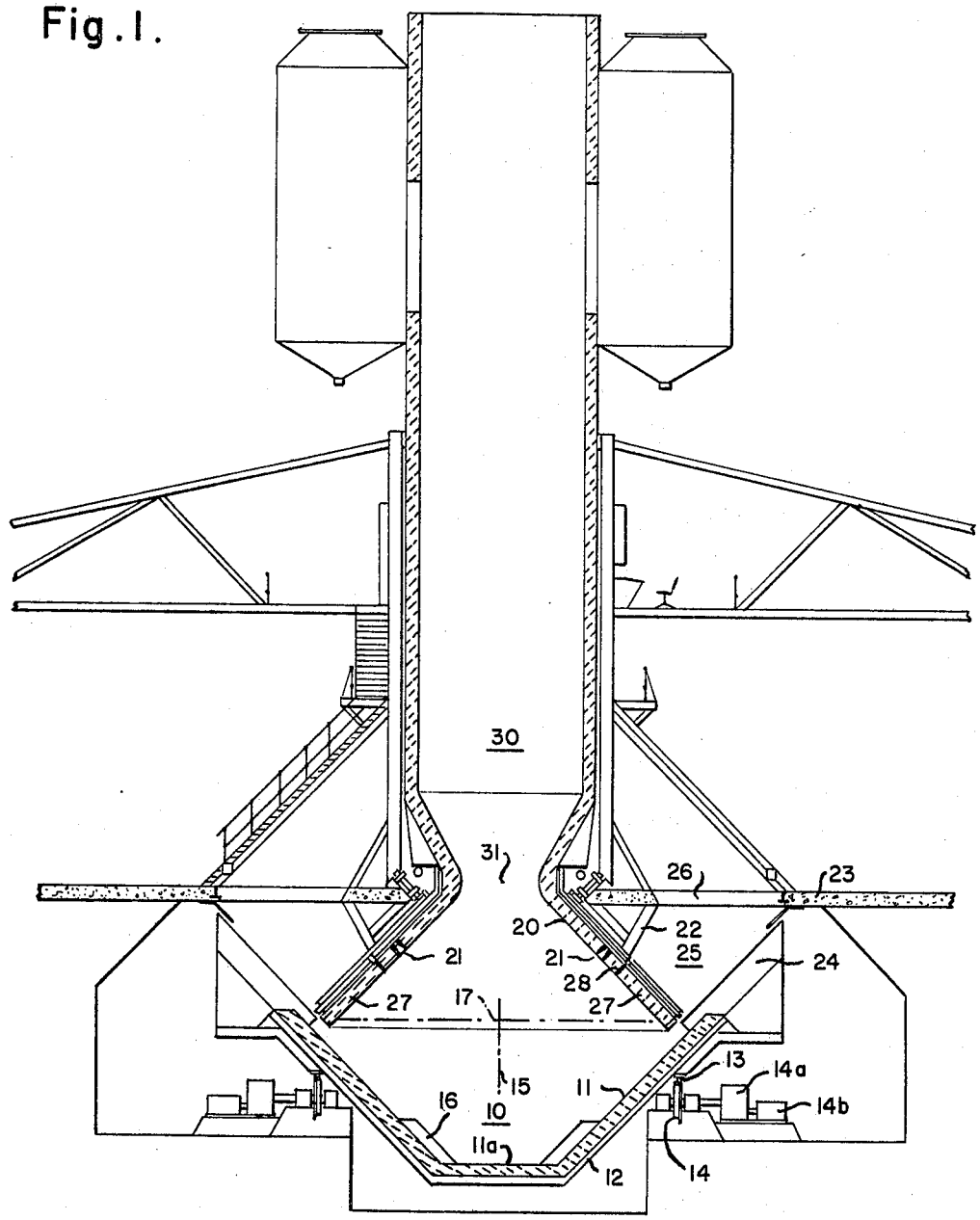

This invention relates to rotary hearth metal melting furnaces for melting metals and particularly to a rotary hearth furnace for melting and mixing oxidizable metal alloys and materials.

There are many industrial situations where it is desirable to melt readily oxidizable metals such as aluminum, particularly ingots and finely divided particles of such metals as for example, metal turnings, trimmings, chips, filings and other scrap. Conventional methods of melting such metals are too slow, too costly or the losses through oxidation are too high to be economically satisfactory. For example, aluminum ingots and scrap are conventionally melted in gas fired reverbatory furnaces or electric furnaces both of which are relatively slow and costly. In the reverbatory furnace, the cost is greatly increased by a requirement for a great deal of manual labor for stirring and rabbling the bath and for removing dross. The electric furnace may be operated to impart mixing through flux changes but the power cost is high.

I have invented a furnace structure which overcomes these problems. By the use of my furnace, it is possible to melt aluminum or similar oxidizable metal ingots, turnings, chips, and similar fine scrap which normally suffers heavy oxidation losses without significant oxidation at a high rate of speed and without the expensive techniques heretofore proposed.

In a preferred embodiment of my invention, I provide a metal melting furnace comprising an inverted frustoconical hearth rotatable about a vertical axis and adapted to contain a molten metal bath, means for rotating said hearth about said vertical axis, a roof supported above and spaced from the hearth, a charging area between said hearth and roof receiving metal to be melted, an opening in the roof having a gate means at said charging area for passing a metal charge to the hearth, said gate means selectively acting as a radially extending plow or blade means depending from said roof adapted to extend into the metal bath to cause flow of metal over a portion of the gate means, a burner in said roof spaced from said opening and directed onto the metal bath and flue means spaced from the burner means for removal of combustion gases. Preferably the gate means directs the molten metal across a portion of the gate and into the scrap to be charged and then downwardly to carry charged metal pieces below the surface while the centrifugal force of the rotating hearth causes the molten metal to move from the axis to the periphery of the hearth and up the sidewall. The gate means is preferably rotatably mounted on and forms a part of the roof and is a permanent part of the roof structure. Upstanding ribs are preferably provided on the hearth to cause rotation of the metal with the hearth.

Figure 2:
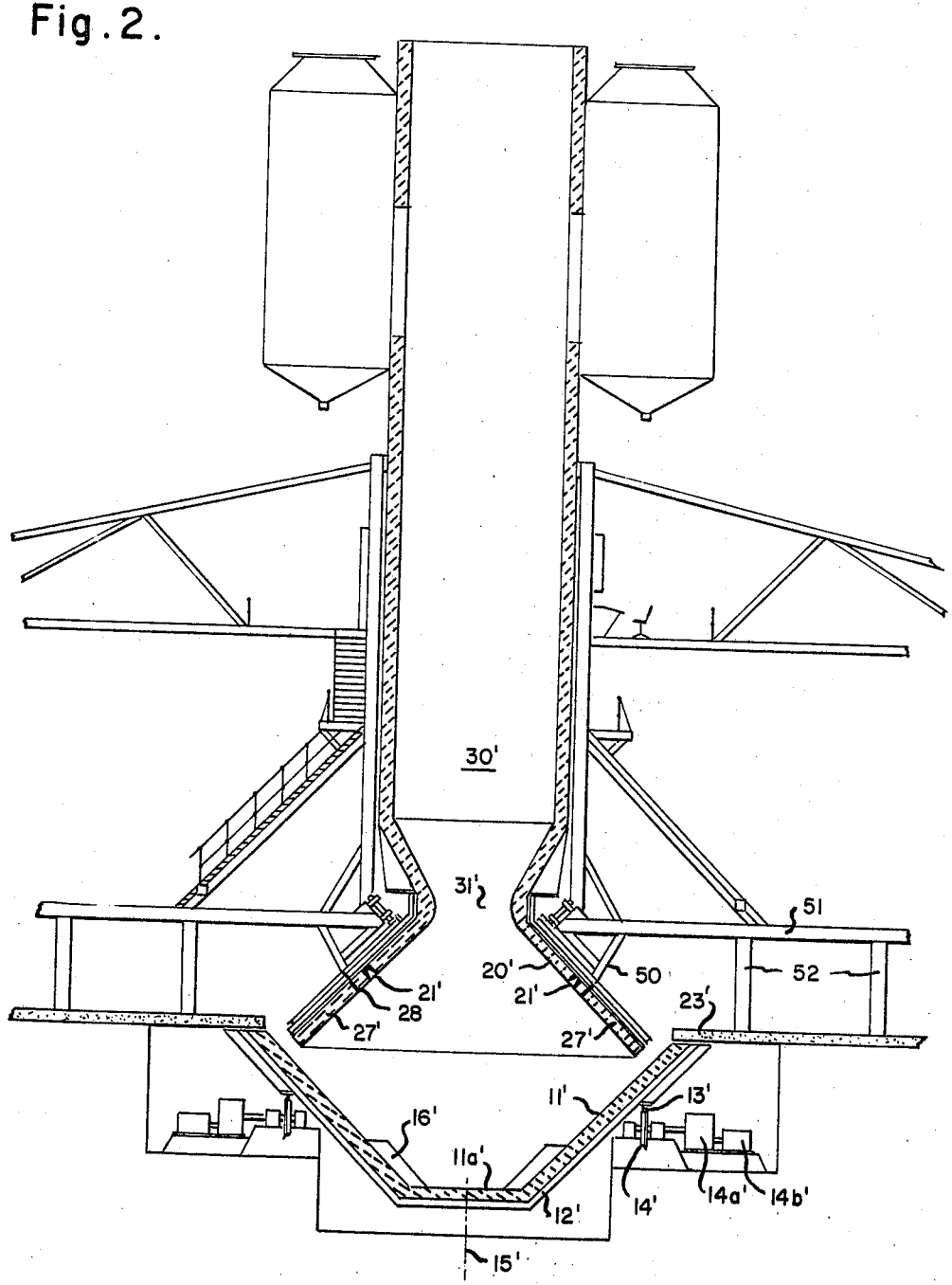

In the foregoing general description, I have set out certain objects, advantages and purposes of my invention. Other objects, purposes and advantages will be apparent from a consideration of the following description and the accompanying drawings in which:

FIGURE 1 is a vertical section through a preferred form of furnace according to my invention; and
FIGURE 2 is a vertical section through a second embodiment of furnace according to my invention.

Referring to the drawings and particularly to FIGURE 1, I have illustrated a hearth 10 having inverted frustoconical sidewalls 11 all of refractory and supported in an outer steel housing 12. A flat hearth bottom 11a connects the walls at their smaller diameter to form the hearth bottom. An annular tire 13 depends from the hearth and is supported on spaced rollers 14. The hearth rotates about an axial line 15. The hearth may be rotated by any well known means as for example by driving rollers 14 through a gear reducer 14a and electric motor 14b. Upstanding radial vanes 16 are provided on the hearth 10 to move the metal bath 17 with the rotating hearth.

A refractory roof 20 having burners 21 mounted therein and directed toward the metal bath is suspended from a roof frame 22 and from the charging floor 23 over the hearth. The charging floor 23 is spaced above the hearth 10 and above the roof 20 and forms with the top of the roof and with extensions 24 on the edge of the hearth a charging hopper 25 receiving scrap through opening 26 in the charging floor. A plurality of doors or gates 27 are pivotally mounted along one edge in openings 28 in the roof. These gates or doors 27 are rotatable about the one edge so that the opposite edge turns downwardly to discharge scrap into the molten metal as well as to create a plowing or turbulent action in the metal which helps to draw the scrap beneath the surface of the molten bath as it is forced through the openings created by rotating the doors and by rotation of the hearth. Rotation of the hearth and the extensions 24 thereof causes the scrap in the charging hopper to be forced through the openings created by rotating the charging doors and forces the scrap downwardly into the molten metal.

Rotation of the doors or gates 27 can be by mechanical means, such as by the means of cams and cam followers or by the use of electrical or pneumatic drive motors, hydraulic motors or by any other well known operating means. A flue 30 is provided axially in the roof 20 spaced from the burners and preferably connected to the roof through a reduced orifice 31.

The operation of the furnace is as follows: The hearth 10 is rotated on rollers 14 by operating the motor 14b. Molten metal on the hearth 10 is caused to rotate with the hearth because of the vanes 16 on the hearth sidewall. This causes the molten metal to move radially outwardly toward the periphery of the hearth and up the sidewalls 11 by reason of centrifugal force. This action causes the metal to assume a dished shape, low at the axis and high at the outer periphery. Scrap is charged through opening 26 into the charging hopper 25 where it rests on roof 20 and hearth extension 24. The doors 27 are rotated about their pivot point to form an opening in the roof. Rotation of the hearth forces the scrap in the charging hopper 25 to move downwardly through the door opening into the molten metal. At the same time, the charging door, which has been opened downwardly, extends into the surface of the molten metal causing it to be plowed so that is rises over and washes over the downward end of the door, helping to carry the scrap downwardly into the metal bath and preventing excessive oxidation. The scrap may be charged by backing a truck or other charging means on the charging floor 23 over the opening 26 and dumping the scrap into the charging hopper. The roof 20 is preferably provided with a multiplicity of doors 27, one following the other, around the periphery of the roof so that a high rate of charging can be accomplished by opening all the doors simultaneously.

In the embodiment illustrated in FIGURE 2, I have used the identical numbers used in describing FIGURE 1 for those parts which are the same with a prime accent added thereto. The difference between the embodiment of FIGURE 1 and that of FIGURE 2 is that in FIGURE 2 the extensions 24 of the hearth have been eliminated and the charging floor 23' is at the level of the top of the refractory wall 11' of the hearth so that the scrap is discharged directly onto the refractory hearth and the charging doors 27' of the roof. In this embodiment, the roof is suspended from a roof frame 50 having main parallel support beams 51 extending parallel to the charging floor and mounted on vertical legs 52. The operation of the furnace is essentially the same as that described in connection with FIGURE 1, excepting that a large charging hopper is not available and the charge metal is discharged directly onto the refractory hearth and the roof 20' and roof doors 27'.

While I have illustrated and described certain preferred practices and embodiments of my invention in the foregoing specification, it will be understood that this invention may be otherwise embodied within the scope of the following claims.

I claim:

1. A metal melting furnace comprising a hearth with inverted frusto-conical sidewalls rotatable about a vertical axis and adapted to contain a molten liquid bath, means for rotating said hearth about said vertical axis, a roof supported above and spaced from the hearth, a charging area between said roof and hearth receiving metal to be melted, an opening in said roof having gate means at said charging area for passing a metal charge to the hearth, said gate means acting in one position to close the roof opening and in the other acting as a radially extending blade means depending from said roof adapted to extend into the liquid bath to cause flow of molten liquid over a portion of the gate means, a burner in said roof spaced from said opening and acting on the molten bath and flue means in said roof spaced from the burner means for removal of combustion gases.

2. A metal melting furnace as claimed in claim 1 wherein the hearth sidewalls are provided with an extension forming with a hopper receiving charging scrap.

3. A metal melting furnace as claimed in claim 1 wherein the hearth is circular and provided with upstanding radial ribs.

4. A metal melting furnace comprising a circular hearth with upstanding inverted frusto-conical sidewalls rotatable about a vertical axis and adapted to contain a molten metal bath, means for rotating said hearth about said vertical axis at a speed sufficient to create a radial flow of molten metal by centrifugal force on said hearth, a roof supported above and spaced from the sidewall of the hearth, a charging area formed by said roof and hearth receiving metal to be melted, a plurality of side by side openings in said roof adjacent the periphery for passing a metal charge to the hearth, gate means in each said opening movable from a closed position in which the gate is closed to an open position in which the gate is rotated so that a portion extends below the roof acting as a radially extending plow depending from said roof adapted to extend into the rotating metal bath to cause flow of metal over a portion of the gate means, a burner in said roof spaced from said opening and acting on the metal bath, flue means in the roof spaced from the burner means for removal of combustion gases and a charging floor above the roof and hearth having an opening communicating with the charging area whereby a scrap charge may be introduced through said opening into the area beneath the floor.

5. A metal melting furnace as claimed in claim 4 wherein the gate means in each opening extends radially from the center of the roof at an incline to the top surface of a bath and is hinged along one radial edge and adapted to extend below the roof into the molten metal bath to cause flow of metal over the other radial edge of said gate.

References Cited
UNITED STATES PATENTS

| | | | |
|---|---|---|---|
| 2,513,569 | 7/1950 | Kuehlthau | 266—25 |
| 2,676,006 | 4/1954 | Martin | 263—26 |
| 2,834,157 | 5/1958 | Bowes | 266—33 X |
| 3,377,059 | 4/1968 | Ankersen | 266—33 |

J. SPENCER OVERHOLSER, Primary Examiner

J. S. BROWN, Assistant Examiner

U.S. Cl. X.R.

263—27